(12) United States Patent
Otaki et al.

(10) Patent No.: US 10,234,327 B2
(45) Date of Patent: Mar. 19, 2019

(54) CALIBRATION DEVICE

(71) Applicant: Tatsuno Corporation, Tokyo (JP)

(72) Inventors: Tsutomu Otaki, Tokyo (JP); Norikazu Osawa, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 169 days.

(21) Appl. No.: 15/273,322

(22) Filed: Sep. 22, 2016

(65) Prior Publication Data

US 2017/0089753 A1   Mar. 30, 2017

(30) Foreign Application Priority Data

Sep. 28, 2015   (JP) .................................. 2015-189393

(51) Int. Cl.
| | |
|---|---|
| *G01F 25/00* | (2006.01) |
| *G01G 17/04* | (2006.01) |
| *G01G 23/01* | (2006.01) |
| *G01G 17/06* | (2006.01) |
| *G01F 23/20* | (2006.01) |

(52) U.S. Cl.
CPC ...... *G01F 25/0046* (2013.01); *G01F 25/0053* (2013.01); *G01G 17/04* (2013.01); *G01G 17/06* (2013.01); *G01G 23/01* (2013.01)

(58) Field of Classification Search
CPC .................................................. G01F 25/0046
See application file for complete search history.

(56) References Cited

U.S. PATENT DOCUMENTS

| | | | |
|---|---|---|---|
| 5,096,006 A | 3/1992 | Howard | |
| 2016/0033085 A1* | 2/2016 | Sirosh ..................... | F17C 13/12 137/2 |

FOREIGN PATENT DOCUMENTS

| | | |
|---|---|---|
| JP | H02309100 | 12/1990 |
| JP | 08035599 A * | 2/1996 |
| JP | H0835599 | 2/1996 |
| WO | WO20130002425 | 1/2013 |

OTHER PUBLICATIONS

European Patent Office, European Search Report, dated Apr. 28, 2017, 9 pages, Munich, Germany.

* cited by examiner

*Primary Examiner* — Son T Le
*Assistant Examiner* — Herbert K Roberts
(74) *Attorney, Agent, or Firm* — Stetina Brunda Garred and Brucker; Mark B. Garred

(57) ABSTRACT

To provide a calibration device for apparatus filling a gas such as hydrogen gas and capable of efficiently and safely measuring weight and amount of the gas such as hydrogen gas that are filled at high pressure. Calibration devices 100, 200, 300, 400 according to the present invention include a measurement housing 1, accommodated in a housing main body 10, to the measurement housing 1 a high pressure fuel gas being fed from outside of the housing main body 10; and a scale 3 for measuring a weight of a fuel gas fed to the measurement housing 1, wherein an inside of the measurement housing 1 is visible from outside of the housing main body 10.

8 Claims, 5 Drawing Sheets

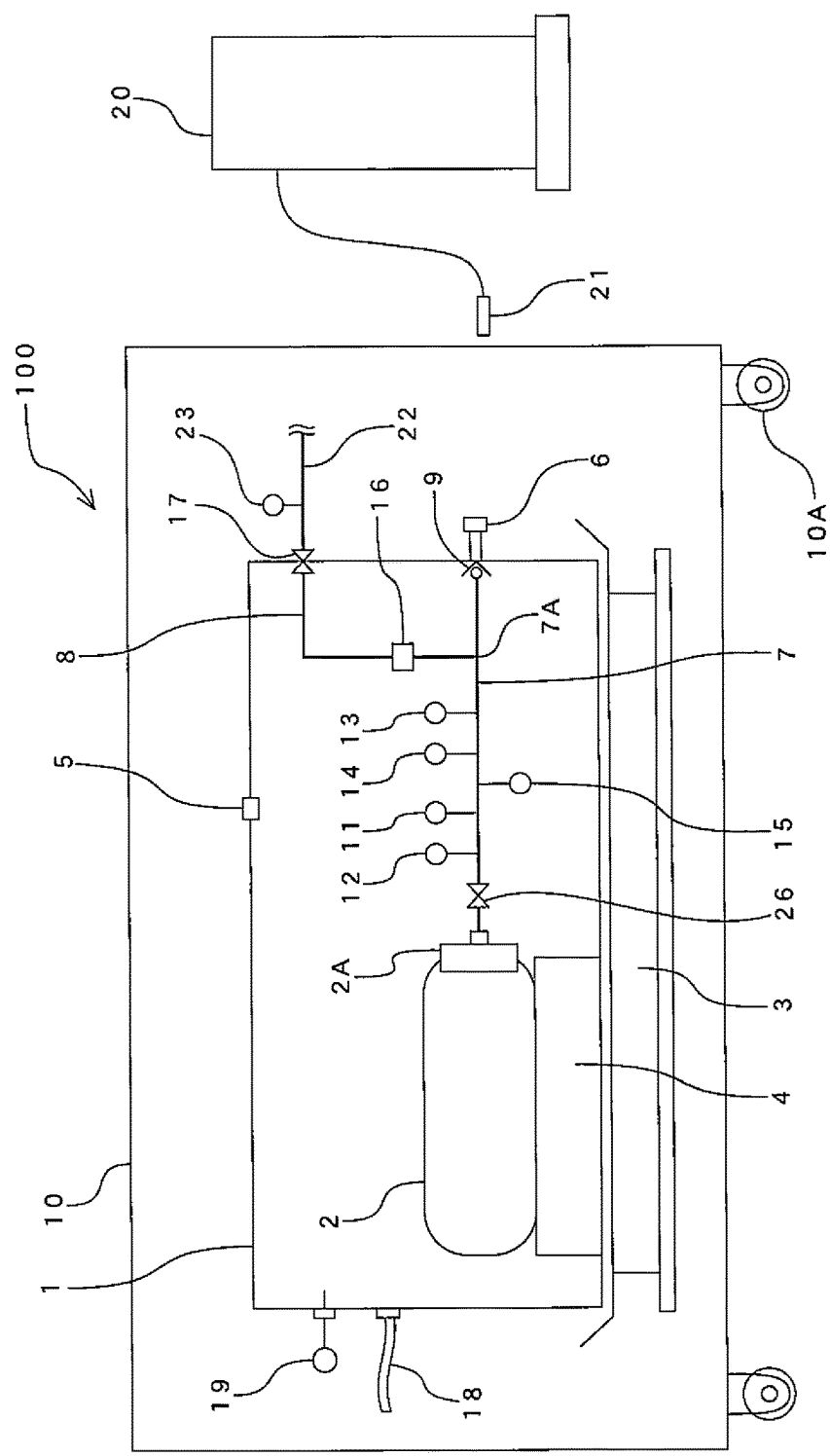
[Fig. 1]

[Fig. 2]
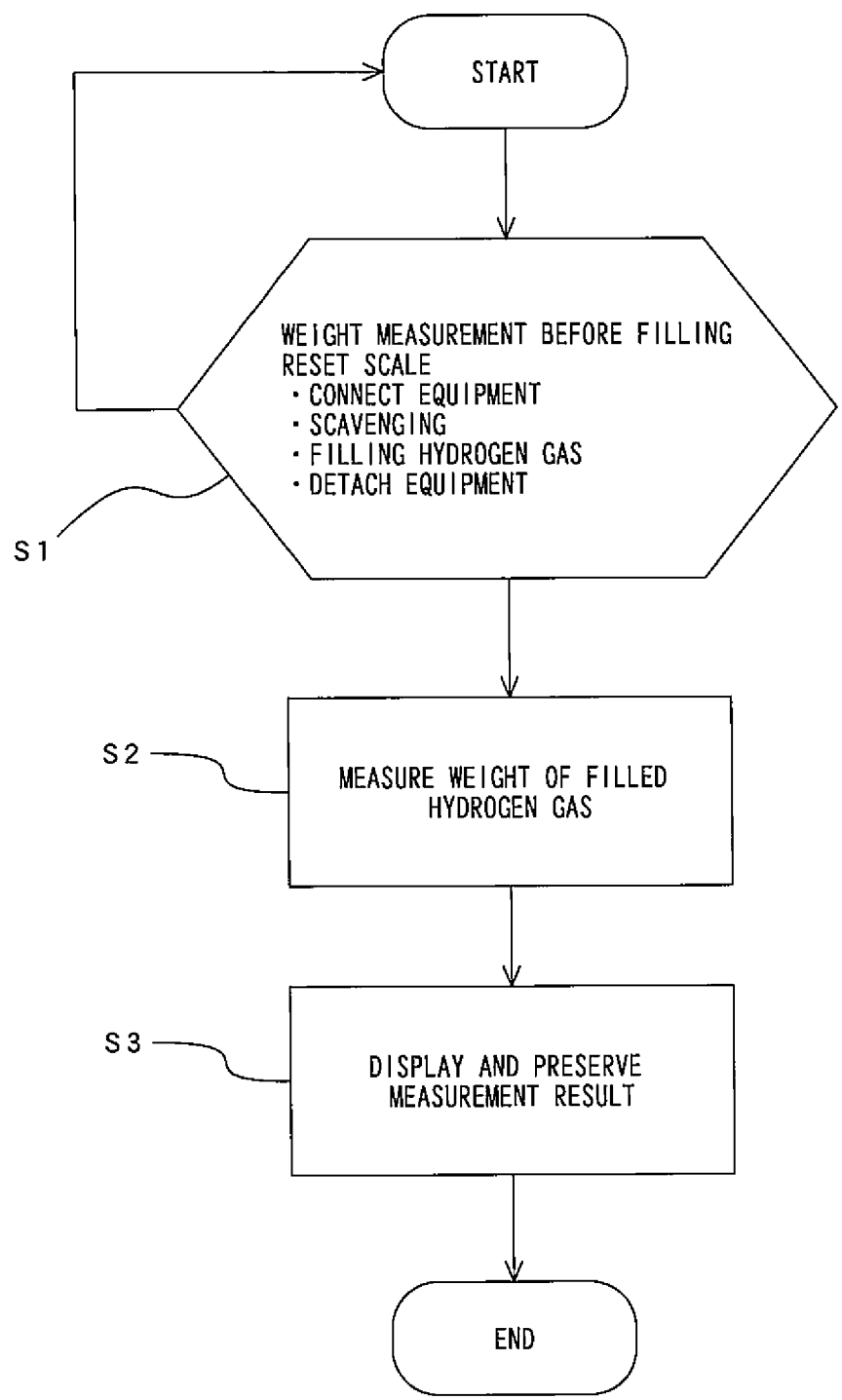

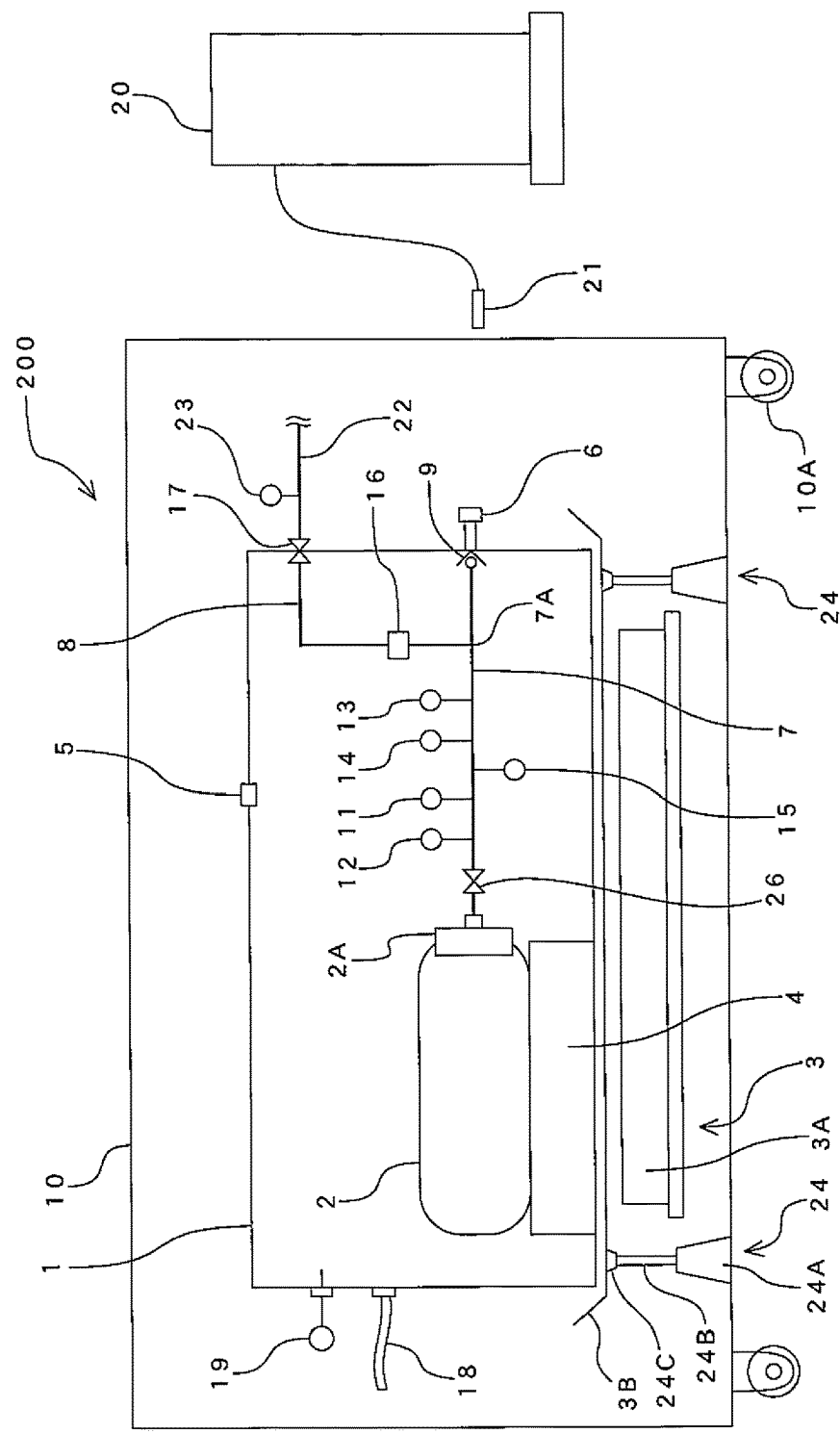
[Fig. 3]

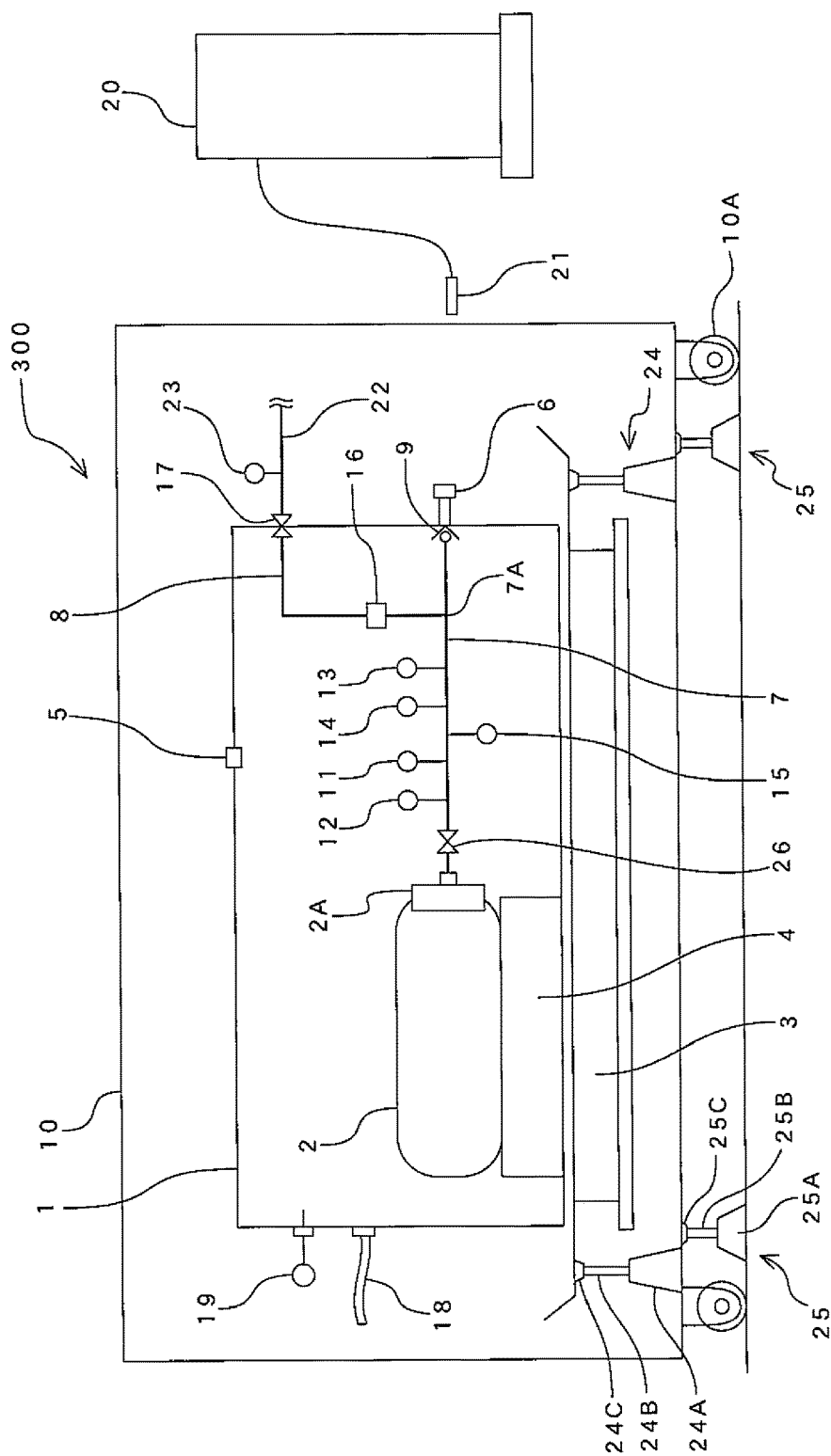
[Fig. 4]

[Fig. 5]
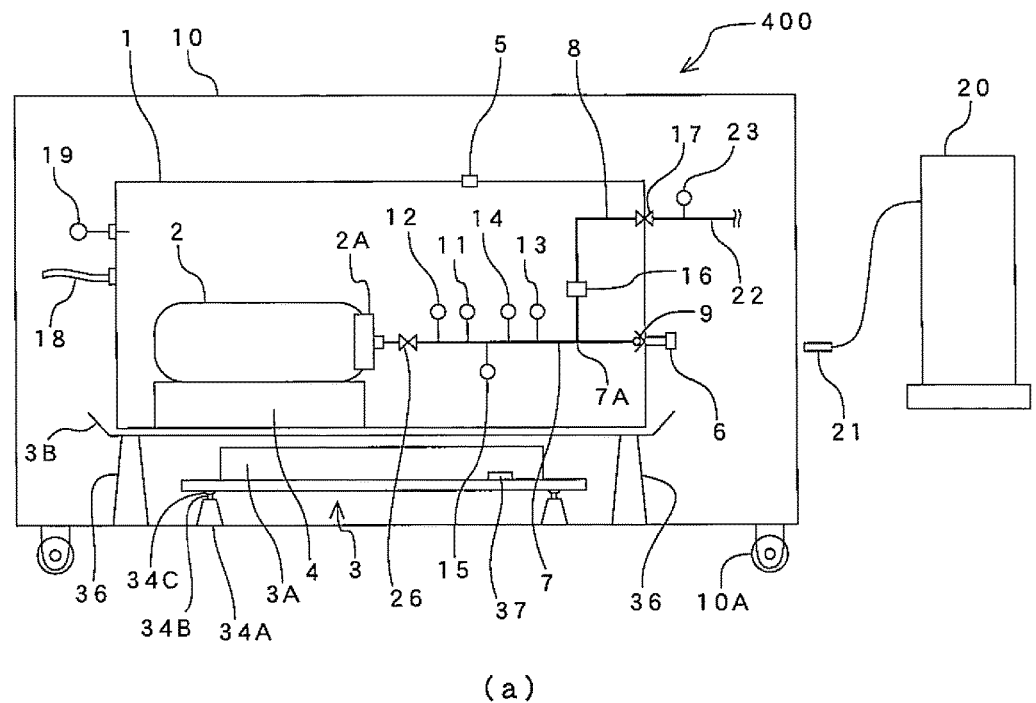
(a)
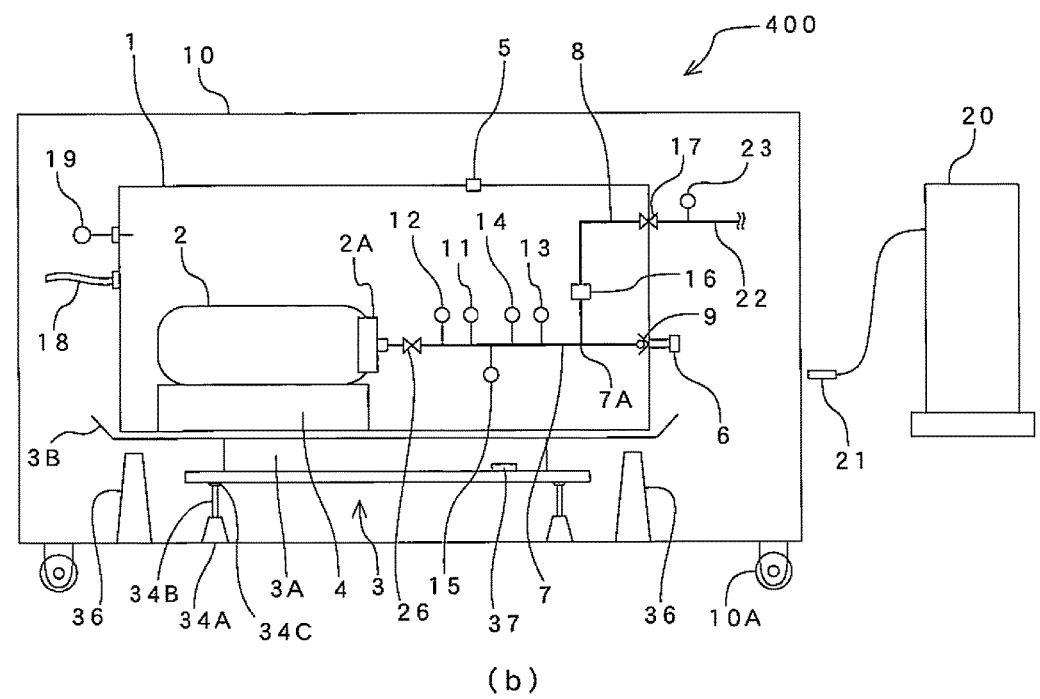
(b)

CALIBRATION DEVICE

CROSS-REFERENCE TO RELATED APPLICATIONS

The present application claims priority to Japanese Patent Application No. 2015-189393 filed on Sep. 28, 2015, the disclosure of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a calibration device for apparatus for filling a gas such as hydrogen gas, and more particularly to a calibration device capable of efficiently and safely measuring weight and quantity of a gas such as hydrogen gas filled at high pressure.

2. Description of the Related Art

Gas meters installed in gas stations are obliged to take flow rate verification every seven years to maintain fair business dealing, and it is requested that instrumental error of the flow meter is within ±0.5 percent. To such request, the applicant proposes a gas meter with inspection mechanism of flow meters in Japanese Patent Publication No. Heisei 07-33197.

In recent years, as a countermeasure for environmental issue, fuel-cell automobiles using hydrogen as fuel have been developed, accordingly hydrogen filling apparatus and calibration devices for hydrogen filling apparatus have been investigated.

In a conventional calibration device for the hydrogen filling apparatus increases temperature of hydrogen when hydrogen is filled from a fuel gas filling apparatus such as the hydrogen filling apparatus to the calibration device, which causes expansion of hydrogen to increase its pressure. Therefore, while the hydrogen is filled in the calibration device, it is necessary to confirm temperature, pressure and the like by eyesight to consider safety of the calibration device.

But, a calibration device for the hydrogen filling apparatus for confirming temperature, pressure and the like by eyesight while the hydrogen is filled in the calibration device, and for efficiently and safely measuring weight of filled hydrogen gas has not been produced yet.

The contents of Japanese Patent Publication No. Heisei 07-33197 is incorporated herein by reference in its entirety.

SUMMARY OF THE INVENTION

The present invention has been made in consideration of the above problems in the conventional arts, and the object thereof is to provide a calibration device for a filling apparatus for a gas such as hydrogen gas and capable of efficiently and safely measuring weight of a filled gas.

The calibration devices 100, 200, 300, 400 according to the present invention are characterized by including: a measurement housing 1, accommodated in a housing main body 10, to the measurement housing 1 a high pressure fuel gas such as hydrogen gas being fed from outside of the housing main body 10; and a scale 3 for measuring a weight of a fuel gas fed to the measurement housing 1, wherein the measurement housing 1 is visible from outside of the housing main body 10.

In the present invention, it is preferable that the measurement housing 1 is made of a transparent resin with antistatic function, particularly of a polycarbonate resin.

In addition, in the present invention, it is preferable that data measured by status monitoring equipment disposed in the measurement housing 1 such as a temperature meter 11, a pressure gauge 12 and a flow meter 15 are transmitted outside the housing main body 10. Here, the transmission can be performed through wire/wireless communication.

Then, it is preferable that the flow meter 15 is mounted in the measurement housing 1 to monitor presence or absence of an excessive flow of the fuel gas.

In the present invention, it is preferable that the depressurizing valve 16 is mounted to a filling gas discharging pipe 8 in the measurement housing 1.

Then, it is preferable that the filling gas discharging pipe 8 is made of a pipe with high pressure resistance in the same manner as a filling gas feeding pipe 7.

Further, in the present invention, it is preferable that the measurement housing 1 is separated from the scale 3 in a vertical direction or is mounted on the scale 3 by a first lifting device 24.

In addition, in the present invention, it is preferable that the housing main body 10 is lifted through the second lifting devices 25 to adjust and secure a horizontal condition of the scale 3. In such a case, it is preferable that by the second lifting devices 25 is directly lifted the scale 3 to secure a horizontal condition thereof.

In addition, it is preferably to mount a level sensor 37 on the scale 3 for judging a horizontal condition of the scale 3.

With the present invention with the above construction, the inside of the measurement housing 1 is visible from outside of the housing main body 10, so that a temperature meter 11, a pressure gauge 12 and a flow meter 15 mounted in the measurement housing 1 as status monitoring equipment can be confirmed easily by eyesight. In addition, presence or absence of dew condensing on the filling vessel 2, the filling gas feeding pipe 7, the filling gas discharging pipe 8 and the like of the measurement housing 1 can be easily confirmed. Then, when an abnormality occurs in the measurement housing 1 other than those described above, the abnormality can be immediately and safely confirmed to deal with it.

In the present invention, forming the measurement housing 1 with a transparent resin with antistatic function makes the inside of the measurement housing 1 visible from outside of the housing main body 10, and prevents that static electricity generates on the measurement housing 1, which improves safety of the calibration device.

Then, forming the measurement housing 1 with a polycarbonate resin with antistatic function decreases the weight of the measurement housing 1 by thinning walls thereof, and secures a predetermined strength because the polycarbonate resin is high strength material.

Here, in a calibration device for determining a weight of filled hydrogen gas by measuring total weight of the measurement housing 1 to determine hydrogen gas filling amount from the weight of the filled hydrogen gas, the reduction in weight realizes the measurement with high accuracy.

In addition, in the present invention, transmitting data measured by status monitoring equipment such as a temperature meter 11, a pressure gauge 12 and a flow meter 15 disposed in the measurement housing 1 outside the housing main body 10 enables to confirm a condition when fuel gas such as hydrogen gas has been filled through a display of each meter by workers in a site performing the calibration. In addition, at a place apart from the site performing the calibration such as an office of a hydrogen station, workers or managers can remotely confirm the condition when the fuel gas has been filled.

Near the measurement housing 1, it is dangerous since a high pressure combustible gas such as hydrogen gas is used, so that detecting abnormal temperature, pressure, flow rate or the like by the status monitoring equipment such as the temperature meter 11, the pressure gauge 12 or the flow meter 15 enables to monitor the calibrating work and the calibration device in a safe condition for the workers and the managers at the place apart from the site performing the calibration, such as inside of an office of a hydrogen station, which is a non-dangerous place apart from the measurement housing 1. Informing to the workers and the managers through an alarm for instance when the abnormal temperature, pressure, flow rate or the like is detected enables to quickly and surely detect the abnormality generated in the calibration work or in the filling by the workers and the managers, so that the workers or the mangers can quickly cope with the abnormality.

In the present invention, not only detecting abnormalities and dangers by the status monitoring equipment such as the temperature sensor 11, the pressure gauge 12 and the flow meter 15, but also normal measurements and memorizations of measurement results can be performed at the place, which is the non-dangerous place apart from the measurement housing 1, such as inside of the office of the hydrogen station, so that with various information processors such as a PC can be accurately and continuously performed the measurements and the memorizations for a long period of time.

In addition, when a high pressure gas such as hydrogen gas for instance is discharged from the filling vessel 2 after the calibrating work, mounting a depressurizing valve 16 to a filling gas discharging pipe 8 in the measurement housing 1 enables to depressurize a pressure of discharging fuel gas such as hydrogen gas to lower than 1 MPa to discharge the fuel gas outside the measurement housing 1 further outside the housing main body 10. Therefore, it can be prevented that the high pressure fuel gas is discharged from the measurement housing 1, which avoids dangers accompanying discharging high pressure gas.

In addition, since it is prevented that the filling gas discharging pipe 8 is detached from the outside-discharging pipe 22 under the condition that the filling gas has high pressure, a possibility that gas leakage generates where the filling gas discharging pipe 8 and the outside-discharging pipe 22 are detached from each other can be decreased.

Further, in the present invention, forming the filling gas discharging pipe 8 with a pipe with high pressure resistance equal to that of the filling gas feeding pipe 7 is safe without breakages even if the depressurizing valve 16 does not function due to breakage or misoperation by workers, and a gas with the same pressure as the filled fuel gas flows in the filling gas discharging pipe 8.

Mounting the depressurizing valve 16 described above enables a dual safety measures.

In the present invention, mounting the first lifting devices 24 for separating the measurement housing 1 from the scale 3 in a vertical direction or mounting the measurement housing 1 on the scale 3 enables to easily and safely mount the measurement housing 1 on the scale, or separate it from the scale 3 at the weight measurements.

Then, not mounting the measurement housing 1 on the scale 3 except when the weight measurements are performed prevents that a zero point and a span, that is a variation range, of the scale 3 vary because vibrations and shocks generated in the measurement housing 1 are not transmitted to the scale 3 when the calibration devices 200, 300, 400 are moved.

Further, the first lifting devices 24 can automatically lift the measurement housing 1, which is heavy weight with several hundred kilograms, without man power, which releases the workers from a hard work for lifting the heavy weight with several hundred kilograms, and secures safety at the lifting of the measurement housing 1.

Here, as the first lifting device 24 can be used a conventionally known device using hydraulic or pneumatic pressure, for example the devices can be placed in the four corners of the measurement housing 1.

In addition, in the present invention, mounting the second lifting devices 25 for lifting the housing main body 10 to adjust and secure a horizontal condition of the scale 3 enables to easily and safely keep a horizontal balance of the scale 3 in a short period of time regardless of an installation place of the calibration device 300 without a heavy work for lifting the housing main body 10 by the workers even when the installation place of the calibration device 300 is inclined and is not flat.

Even when the second lifting devices 25 are mounted, the first lifting devices 24 can be mounted also, and the horizontal condition of the scale 3 can be secured by lifting it through the first lifting devices 24. As the second lifting device 25 can be used a conventionally known device using hydraulic or pneumatic pressure, for example the devices can be placed in the four corners of the measurement housing 1.

Further, mounting the level sensor 37 for judging a horizontal condition of the scale 3 on the scale 3 enables to easily confirm the horizontal condition of the scale 3.

BRIEF DESCRIPTION OF THE DRAWINGS

FIG. 1 is a block diagram showing the first embodiment of the present invention;

FIG. 2 is a flow chart showing a calibration procedure using the first embodiment;

FIG. 3 is a block diagram showing the second embodiment of the present invention; and FIG. 4 is a block diagram showing the third embodiment of the present invention.

FIG. 5 is a block diagram showing the fourth embodiment of the present invention.

DETAILED DESCRIPTION

Next, embodiments of the present invention will be explained with reference to the drawings.

At first, the first embodiment of the present invention will be explained while referring to FIGS. 1 and 2.

In FIG. 1, a calibration device according to the first embodiment of the present invention is totally shown by a numeral character 100. The calibration device 100 is provided with: a measurement housing 1; and a scale 3 for measuring a weight of fuel gas fed to the measurement housing 1. The measurement housing 1 is accommodated in a housing main body 10, and to the measurement housing 1 is fed high pressure fuel gas such as hydrogen gas from a fuel gas filling apparatus 20 positioned at outside of the housing main body 10.

The housing main body 10 accommodating the measurement housing 1 and the scale 3 has moving means 10A such as wheels on its bottom face, and the calibration device 100 can be moved to a position where the hydrogen filling apparatus 20 to be calibrated is installed.

Hereinafter, the explanation will be made when hydrogen gas is adopted as a fuel gas.

The weights of the measurement housing 1 before and after filling hydrogen gas are measured by the scale 3, and the weight of the hydrogen gas fed to and filled in a filing vessel 2 is calculated from the difference between the both weights.

The measurement housing 1 is made of a polycarbonate resin with antistatic function. Since the polycarbonate resin is transparent material with high strength, the inside of the measurement housing 1 is visible from outside of the housing main body 10, and a predetermined strength of the measurement housing 1 is secured even when the measurement housing 1 is lightened by thinning thickness of walls of the measurement housing 1. Further, the measurement housing 1 is manufactured with the polycarbonate resin with antistatic function, which prevents static electricity from generating to secure safety of the calibration device 100 as a device for treating hydrogen gas.

On the side face of the measurement housing 1 is mounted a receptacle 6 as a hydrogen reception port. When hydrogen gas is filled in the filling vessel 2 for calibration, coupling a filling nozzle 21 with the receptacle 6 allows the hydrogen filling apparatus 20 to be connected to the measurement housing 1, and from the hydrogen filling apparatus 20 is fed hydrogen gas to the filling vessel 2.

The filing vessel 2 is fixed on the bottom face of the measurement housing 1 through a supporting member 4.

In the measurement housing 1, the receptacle 6 and the filling vessel 2 are connected through a filling gas supply pipe 7.

In FIG. 1, the numeral 2A indicates a filling gas intake portion in the filling vessel 2, and the numeral 9 shows a check valve, mounted to the filling gas supply pipe 7, for preventing backflow of the hydrogen gas.

To the filling gas supply pipe 7 are mounted a temperature sensor 11 and a pressure gauge 12 as status monitoring parts for the fed gas. In addition, a temperature transmitter 13, a pressure transmitter 14 and a flow meter 15 are mounted to the filling gas supply pipe 7, and by the temperature transmitter 13 are transmitted data measured by the temperature sensor 11 to a place apart from the measurement housing 1 such as an information processor not shown, which is installed in an office of a hydrogen station, through wire/wireless communication, and by the pressure transmitter 14 are transmitted data measured by the pressure sensor 12 to the place apart from the measurement housing 1 through wire/wireless communication.

Measurement results of the temperature sensor 11 and a pressure gauge 12 as status monitoring parts can be confirmed through the measurement housing 1, which is visible from outside of the housing main body 10 and is made of the polycarbonate resin with antistatic function, by workers in a site. The temperature transmitter 13, the pressure transmitter 14 and the flow meter 15 can remotely confirmed at the place apart from the site where information processors not shown are installed in the office of the hydrogen station for instance, by managers also.

The temperature transmitter 13, the pressure transmitter 14 and the flow meter 15 separately have a conventional known alarm not shown, and when an abnormal value is detected as each measurement result, the abnormality can be informed through the alarm to the workers in the site where the calibration device 100 is installed, and to the manager in the place apart from the site where information processors not shown are installed in the office of the hydrogen station for instance.

In addition, since data measured by the temperature sensor 11, the pressure gauge 12 and the flow meter 15 can be transmitted to the information processors installed in the office of the hydrogen station, the measured data can be accumulated to the information processors, and accurate and continuous measurements and memorizations for a long period of time can be performed.

Mounting the flow meter 15 to the filling gas supply pipe 7 can monitor an abnormality of excessive flow rate of hydrogen gas.

[001.] On the filling gas supply pipe 7 is formed a branching portion 7A, and a filling gas discharging pipe 8 is mounted to connect the branching portion 7A to a shut-off valve 17, and the shut-off valve 17 is disposed on the side face portion of the measurement housing 1. Then, to the filling gas discharging pipe 8 is mounted a depressurizing valve 16.

Since the filling gas discharging pipe 8 is formed of material with high pressure resistance equal to that of the filling gas feeding pipe 7, the pipe 8 is hardly broken even if the depressurizing valve 16 is broken or misoperated by the workers and high pressure gas flows in the filling gas discharging pipe 8.

Not shown in the drawings clearly, the shut-off valve 17 mounted to the filling gas discharging pipe 8 is closed when hydrogen gas is filled in the filling vessel 2 and is opened when the hydrogen gas is discharged from the filling vessel 2.

In addition, a master valve 26, which is a solenoid valve, is mounted between the branching portion 7A and the filling vessel 2, and the master valve 26 is remotely and instantly opened/closed from outside of the housing main body 10, which can stop flowing of the hydrogen gas in the filling gas supply pipe 7 at an emergency mode.

When the hydrogen gas is discharged from the filling vessel 2, the hydrogen gas discharged from the filling vessel 2 flows in the filling gas supply pipe 7 to the filling gas discharging pipe 8 through the branching portion 7A. The discharged hydrogen gas flowing in the filling gas discharging pipe 8 is depressurized to be low pressure such as lower than 1 MPa. Then, from the opened shut-off valve 17 through an outside-discharging pipe 22 and a gas discharging mechanism not shown outside the housing main body 10 is discharged the hydrogen gas with low pressure. In addition, the numeral 23 is a pressure gauge for measuring pressure of the hydrogen gas flowing through the outside-discharging pipe 22.

Even when the hydrogen gas flows from the branching portion 7A of the filling gas supply pipe 7 to the receptacle 6, the flow is shut off by the check valve 9, so that it is prevented that the hydrogen gas leaks on the side of the receptacle 6.

On the upper face of the measurement housing 1 is mounted a filling gas outlet 5, and when in the measurement housing 1 is filled dry gas or inert gas, gases with moisture such as air in the measurement housing 1 are discharged outside the measurement housing 1 through the filling gas outlet 5. The gases with moisture are discharged outside the housing main body 10 through a gas discharging mechanism not shown.

In FIG. 1, on the side face of the measurement housing 1 is detachably mounted a dry gas pipe 18 for feeding dry gas in the measurement housing 1. The dry gas is fed to and filled in the measurement housing 1 from a supply source not shown through the dry gas pipe 18. Filling the dry gas in the measurement housing 1 discharges gases with moisture such as air outside the measurement housing 1, and in the measurement housing 1 fills the dry gas only. Therefore, even when the hydrogen gas, which has been cooled at −40° C. for instance, is fed in the filling vessel 2, it is prevented dews condense on surfaces of the equipment in the measurement housing 1.

Here, as the dry gas can be utilized inert gas such as nitrogen, argon and helium, carbon dioxide, and dried air. As the dry gas can be adapted any gases that can be obtained at low cost; easily filled into or discharged from the measurement housing 1 for a short period of time; and has a characteristic contributing to improvement of safety.

Further, on the side face of the measurement housing 1 is mounted a dew-point instrument 19 to perform proper humidity management in the measurement housing 1 based on the measured results of the dew-point instrument 19.

When the dew-point temperature of the dew-point instrument 19 reaches a predetermined temperature, which can be judging it is sufficiently dried in the measurement housing 1, which is −20° C. for instance, by observing the dew-point temperature, fuel gas such as hydrogen gas, which has been cooled to −40° C., is fed, which decreases amount of dews condensing on the filling vessel 2, the filling gas supply pipe 7, the receptacle 6 and the like and has little effect on the weight measurements. For example, it is expected that decreasing the dew point to −40° C. or less for instance causes the amount of the condensing dew to become zero, but the difference between the amount at −40° C. or less and that at −20° C. or less is small. Therefore, it is realistic and economical that the dew-point temperature is set from −20° C. to −25° C. as a reference dew-point temperature that can be judged to be necessarily and sufficiently dried.

In the embodiment shown in the drawings, the dew-point instrument 19 is mounted outside the measurement housing 1, but can be mounted inside the measurement housing 1.

Further, a control device not shown for transmitting measured values by the dew-point instrument 19 via infrared communication to the hydrogen filling apparatus 20 can be arranged to the dew-point instrument 19, which can control, with a simple construction, the hydrogen filling apparatus 20 so as to start the filling when the dew-point temperature in the measurement housing 1 reaches the predetermined temperature.

Not shown in the drawings clearly, the measurement housing 1 is semi-enclosed structure. Here, "semi-enclosed structure" means a structure realizing not perfectly sealed state, but nearly sealed state. As the measurement housing 1 is semi-enclosed structure, feeding the dry gas in the measurement housing 1 makes an inner part of the measurement housing 1 slightly pressurized, so that it is prevented that air with moisture enters into the measurement housing 1.

At the weight measurements at the calibration, connecting the filling nozzle 21, the outlet-discharging pipe 22, the dry gas pipe 18 and the various sensors not shown to the measurement housing 1 transmits stresses generated at the filling nozzle 21, the outlet-discharging pipe 22, the dry gas pipe 18 and the sensors to the scale 3, so that there is a possibility that the stresses effect on the measurement results of the scale 3.

In order to eliminate the possibility, when the weight measurements are performed at the calibration, the filling nozzle 21, the outlet-discharging pipe 22, the dry gas pipe 18 and the sensors are separated from the measurement housing 1.

When at the weight measurements of the housing 1, the dew-point instrument 19 can be separated from the measurement housing 1 also.

Next, a procedure of calibration using the calibration device 100 shown in FIG. 1 will be explained while referring to a flowchart shown in FIG. 2.

In the FIG. 2, in the step S1 is measured the weight of the measurement housing 1 to which the dry gas pipe 18, the filling nozzle 21, the outlet-discharging pipe 22, the temperature transmitter 13, the pressure transmitter 14 and the flow meter 15 are not connected, by the scale 3.

In the scale reset in the step S1, the dry gas pipe 18 and the filling nozzle 21 are connected to the measurement housing 1 as a connecting work; air and other gases with moisture in the measurement housing 1 are discharged as a scavenging work; the hydrogen gas is filled from the hydrogen filling apparatus 20 to be calibrated to the filling vessel 2 as a filling work; and the dry gas pipe 18 and the filling nozzle 21 are detached from the measurement housing 1 as a detaching work.

More specifically, in the connecting work in the step S1, to the side face of the measurement housing 1 is connected the dry gas pipe 18. Then, to the receptacle 6 mounted on the side face of the measurement housing 1 is connected the filling nozzle 21 of the hydrogen filling apparatus 20.

In addition, as occasion demands, the temperature transmitter 13, the pressure transmitter 14 and the flow meter 15 are connected to the filling gas supply pipe 7.

In the scavenging work in the step S1, the dry gas is fed to and filled in the measurement housing 1 from a dry gas supply source not shown through the dry gas pipe 18. Filling the dry gas in the measurement housing 1 discharges gases with moisture such as air existing in the measurement housing 1 from the gas discharging port 5 outside the measurement housing 1.

At the scavenging work in the step S1, the measured values by the dew-point instrument 18 are monitored at all time. The dew-point temperature gradually decreases as the scavenging progresses, and the humidity in the measurement housing 1 decreases. Then, when the dew-point temperature in the measurement housing 1 reaches a prescribed temperature, which is −20° C. for instance, it is judged that inside of the measurement housing 1 is necessarily and sufficiently dried to an extent that when even hydrogen gas that is cooled at −40° C. is fed, dew does not condense on the equipment in the measurement housing 1.

Then, when the dew-point temperature in the measurement housing 1 reaches a prescribed temperature, which is −20° C. for instance, that is a dew-point temperature that can be judged it is sufficiently dried in the measurement housing 1, and for example, hydrogen gas that is cooled at −40° C., is fed, amount of dews condensing on the receptacle 6, the filling gas supply pipe 7, the filling vessel 2 and other parts becomes few, so that the amount hardly effects on the weight measurements. Here, it is expected that decreasing the dew point to −40° C. or less for instance causes the amount of dew condensed to become zero, but the difference between the amount at −40° C. or less and that at −20° C. or less is small. Therefore, it is realistic and economical that the dew-point temperature is set from −20° C. to −25° C. as a reference dew-point temperature that can be judged to be necessarily and sufficiently dried.

When the dew-point temperature reaches the predetermined temperature at the scavenging work in the step S1 and it can be judged it is necessarily and sufficiently dried in the measurement housing 1, the filling work in the step S1 is performed.

The filling work is performed while confirming the status monitoring equipment mounted to the filling gas supply pipe 7 such as the temperature transmitter 13, the pressure transmitter 14 and the flow meter 15 by the worker in the site for performing the calibration or the manager in the place apart from the site such as the office of the hydrogen station. Therefore, when an abnormality occurs in temperature, pressure or flow rate of hydrogen gas flowing in the filling gas supply pipe 7, it is possible to rapidly deal with it after detecting it.

The filling of the hydrogen gas is performed until it is judged that a predetermined amount of hydrogen gas is fed by the pressure gauge 12 or the pressure transmitter 14 of the calibration device 100.

After the filling work, the detaching work in the step S1 is performed.

In the detaching work, the dry gas pipe 18, the filling nozzle 21, the temperature transmitter 13, the pressure transmitter 14, the flow meter 15 and the outside-discharging pipe 22 are detached. Detaching the dry gas pipe 18 from the measurement housing 1, at the weight measurements in the step S2, removes effects by stresses generated in members configuring the dry gas pipe 18 on the measurements with the scale 3, and it is prevented that the stresses vary the results of the weight measurements.

When the step S1 is finished the procedure moves to the step S2.

In the step S2, with the scale 3 is measured the weight of the measurement housing 1 after hydrogen gas is filled in the filling vessel 2 of the measurement housing 1 from the hydrogen filling apparatus 20.

When the weight of the measurement housing 1 after hydrogen gas is filled in the filling vessel 2 is measured, dew does not condense on the parts such as the filling vessel 2, so that an error due to the dew can be eliminated, and accurate measurements can be performed.

Then, from the difference between the weight of the measurement housing 1 before the filling of the hydrogen gas and that after the filling is calculated the weight of the hydrogen gas filled in the filling vessel 2, and the amount of the hydrogen gas filled is calculated. Then, comparing the calculated filled amount with the filled amount determined based on the flowmeter of the hydrogen filling apparatus 20 to be calibrated calibrates the hydrogen filling apparatus 20. When the step S2 is finished the procedure moves to the step S3.

In the next step S3 are displayed the weight value of the hydrogen gas as a measurement result in the step S2, the filled amount of the hydrogen gas, which is calculated based on the weights of the measurement housing 1 before and after the filling, and the result of the calibration.

Further, the filling amount of the hydrogen gas, which is the measurement result in the step S2, or the weight of the filled hydrogen gas is stored to a memorizing device of an information processor such as a PC for management not shown together with an identification number such as a product number of the hydrogen filling apparatus 20 to be calibrated, and day and time performing the calibration. To the PC for management are stored and accumulated data measured by the status monitoring equipment such as the temperature transmitter 13, the pressure transmitter 14 and the flow meter 15, and the data can be utilized for continuous measurements and records.

Then, the calibration procedure is finished.

Not shown in FIG. 2 clearly, but in case that the calibration for a hydrogen filling apparatus other than the hydrogen filling apparatus 20 shown in the drawings is performed by the calibration device 100 subsequently to the calibration of the hydrogen filling apparatus 20, after the step S3, the outside-discharging pipe 22 is connected, and the hydrogen gas filled in the filling vessel 2 is discharged outside the measurement housing 1 through the filling gas discharging pipe 8 and the shut-off valve 17.

At the discharge of the hydrogen gas, the pressure in the filling vessel 2 is reduced to less than 1 Mpa for instance by the depressurizing valve 16, so that outside the measurement housing 1 is discharged low pressure safety hydrogen gas.

Then, the procedure returns to "START" in FIG. 2, works in the steps S1-S3 are performed.

With the first embodiment shown in the FIGS. 1 and 2, the measurement housing 1 is made of polycarbonate resin with antistatic function, and the polycarbonate resin is high strength material.

Therefore, the temperature meter 11, the pressure gauge 12 and the flow meter 15 mounted in the measurement housing 1 as the status monitoring equipment can be easily confirmed by eyesight. In addition, presence or absence of dew condensing on the filling vessel 2, the filling gas feeding pipe 7, the filling gas discharging pipe 8 and the like in the measurement housing 1 can be confirmed easily. Other than the dew condensation, when an abnormality occurs in the measurement housing 1, it is possible to rapidly deal with it after detecting it.

In addition, forming the measurement housing 1 with polycarbonate resin with antistatic function can prevent static electricity from generating, which can secure safety required as a device handling hydrogen gas as a fuel gas.

Further, forming the measurement housing 1 with high strength material such as polycarbonate resin enables to manufacture the measurement housing 1 while decreasing the weight of the measurement housing 1 by thinning walls thereof, and securing a predetermined strength. In the embodiment shown in the drawings, the calibration device 100 determines amount of filled hydrogen from weight, so that it is required to measure total weight of the measurement housing 1. Therefore, lightening the measurement housing 1 contributes to improvement in accuracy when the amount is determined.

Near the measurement housing 1, it is dangerous since a high pressure combustible gas such as hydrogen gas is used. With the first embodiment, data measured by the temperature transmitter 13, the pressure transmitter 14 and the flow meter 15 accommodated in the measurement housing 1 are transmitted outside. Therefore, in addition that workers in a site for calibration can confirm a condition by the display of each meter in the measurement housing 1, in a place apart from the site such as an office of a hydrogen station can remotely confirm managers the condition by measured data transmitted therefrom. That is, in a place where is non-dangerous, apart from the measurement housing 1 is it possible to perform safe monitoring.

Then, when an abnormality in temperature, pressure or flow rate is detected by the temperature transmitter 13, the pressure transmitter 14 or the flow meter 15, detected abnormality can be informed to the works and the mangers by an alarm, so that it becomes possible to immediately and surely detect the abnormality to deal with it.

In addition, transmitting the data measured by the status monitoring parts such as the temperature transmitter 13, the pressure transmitter 14 or the flow meter 15 to an information processor such as a PC installed in the place apart from the measurement housing 1 such as the office of the hydrogen station enables to perform accurate and continuous memorizations for a long period of time.

In addition, with the first embodiment, since to the filling gas discharging pipe 8 of the measurement housing 1 is mounted the depressurizing valve 16, when high pressure gas such as hydrogen gas is discharged from the filling vessel 2, the gas can be depressurized to low pressure such as lower than 1 MPa by the depressurizing valve 16 to discharge it outside the measurement housing 1 further outside the housing main body 10. Therefore, the hydrogen gas discharged from the measurement housing 1 becomes low in pressure and safe.

Then, it is not needed that detaching the filling gas discharging pipe 8 from the outside-discharging pipe 22 is performed under a condition that the high pressure gas exists, which decreases a possibility of generating abnormalities such as gas leakage.

Further, in the first embodiment, forming the filling gas discharging pipe 8 with material with high pressure resistance equal to that of the filling gas feeding pipe 7 prevents the filling gas discharging pipe 8 from breaking, so it is safe, even if the depressurizing valve 16 does not function due to breakage or misoperation by the workers, and a high-pressure gas with the same pressure as the filled fuel gas flows in the filling gas discharging pipe 8.

Next, the second embodiment of the present invention will be explained while referring to FIG. 3.

In FIG. 3, a calibration device according to the second embodiment of the present invention is totally shown by a numeral character 200. The calibration device 200 further includes the first lifting devices 24 for separating the measurement housing 1 from the scale 3 in a vertical direction or mounting the measurement housing 1 on the scale 3.

Constructions in the second embodiment other than those described above are the same as those of the calibration device 100 of the first embodiment explained while referring FIGS. 1 and 2.

In FIG. 3, the first lifting devices 24 are separately disposed to four corners, for instance, of a scale pedestal portion 3B and on the bottom portion of the housing main body 10 so as to support a substantially rectangular flat face of the scale pedestal portion 3B. On the scale pedestal portion 3B is mounted the measurement housing 1.

The first lifting device 24 is a conventionally known stand-type lifting device with hydraulic pressure, pneumatic pressure or other hydrostatic pressure such as a jack, and is provided with: a main body portion 24A including a hydraulic cylinder not shown; an extendable rod 24B of the hydraulic cylinder; and a supporting portion 24C.

The first lifting devices 24 are disposed to the four corners of the scale pedestal portion 3B; the supporting portions 24C of the first lifting devices 24 support the four corners of the scale pedestal portion 3B; and the hydraulic pressure lengthens/shortens the extendable rods 24B to lift the scale pedestal portion 3B on which the measurement housing 1 is mounted.

Except at a process for measuring weights, the extendable rods 24B of the first lifting devices 24 are lengthened, and the scale pedestal portion 3B on which the measurement housing 1 is separated from the scale main body portion 3A in a vertical direction. That is, except for the weight measurements, a condition that the measurement housing 1 is separated from the scale 3, which is a condition that the weight of the measurement housing 1 is not measured, is maintained.

In addition, maintaining the condition that the measurement housing 1 is separated from the scale 3 except for weight measurements prevents, even when vibrations and shocks are transmitted to the measurement housing 1 by the movement of the calibration devices 100, the vibrations and the shocks from transmitting to the scale 3. Therefore, it is prevented that the scale 3 breaks down, and a zero point and a span, which is variation change, of the scale 3 change.

Meanwhile, at the weight measurements, the extendable rods 24B of the first lifting device 24 are shortened to move the scale pedestal portion 3B down. With this, the scale pedestal portion 3B on which the measurement housing 1 is mounted is in a state that separated from the scale main body portion 3A changes to a state that it is mounted on the scale 3.

That is, at the weight measurements is mounted the measurement housing 1 on the scale 3. Then, the extendable rods 3B of the measurement housing 1 are further shortened to separate the first lifting devices 24 from the scale pedestal portion 3B.

When by the first lifting devices 24 disposed in the four corners of the scale pedestal portion 3B is lifted the measurement housing 1, in order to keep a horizontal condition of the measurement housing 1, positions in a vertical direction and lifting velocities of the supporting portions 24C of the first lifting device 24 are adjusted.

A calibration procedure using the calibration device 200 shown in FIG. 3 is basically the same as that of the calibration device 100 according to the first embodiment explained while referring to FIG. 2. But, in the embodiment shown in FIG. 3, before the weight measurements at the calibration, work for mounting the measurement housing 1 on the scale 3 by shortening the extendable rods 24B of the first lifting devices 24 is performed.

With the second embodiment shown in FIG. 3, when the weight measurements are performed at the calibration, the measurement housing 1 can be automatically and safely mounted on the scale 3 without man power.

Other than at the weight measurements, detaching the measurement housing 1 from the scale 3 prevents vibrations and shocks transmitted to the measurement housing 1 from transmitting to the scale 3, which prevents the scale 3 from being broken or the zero point or the span, that is variation change, from changing.

Constructions and effects in the second embodiment other than described above are the same as those of the first embodiment shown in FIGS. 1 and 2.

Next, the third embodiment of the present invention will be explained while referring to FIG. 4.

In FIG. 4, a calibration device according to the second embodiment of the present invention is totally shown by a numeral character 300. The calibration device 300 includes the second lifting devices 25 in addition to the first lifting devices 24. Then, the second lifting devices 25 adjust and secure a horizontal condition of the housing main body 10, which can adjust and secure a horizontal condition of the scale 3 mounted in the housing main body 10.

Constructions in the third embodiment other than those described above are the same as those of the calibration device 200 of the second embodiment.

As shown in FIG. 4, the second lifting devices 25 are separately disposed, in order to support the housing main body 10, in the four corners of the housing main body 10 on the ground. In addition, in the housing main body 10 is mounted the first lifting devices 24, and the first lifting devices 24 can mount the measurement housing 1 on the scale 3 or separated the measurement housing 1 from the scale 3.

The second lifting device 25 is a conventionally known stand-type lifting device with hydraulic pressure, pneumatic pressure or other hydrostatic pressure such as a jack, and is provided with: a main body portion 25A including a hydraulic cylinder not shown; an extendable rod 25B of the hydraulic cylinder; and supporting portion 25C.

In order to adjust and secure a horizontal condition of the housing main body 10, the second lifting devices 25 are separately disposed in four corners, and the supporting potions 25C separately touch to the four corners.

When the second lifting devices 25 are disposed below the bottom face of the housing main body 10, the hydraulic cylinder not shown of the main body portion 25A is sufficiently shortened.

Gradually lengthening the extendable rods 25B of the second lifting devices 25 allows the supporting portions 25C to contact the bottom face of the housing main body 10. In that case, extended amounts of the hydraulic cylinders not shown of the main body portions 25A in the second lifting devices 25 are controlled in such a manner that the housing main body 10 is brought into a horizontal condition.

When a place where the calibration device 300 is installed is inclined or is not flat, extended amounts of the hydraulic cylinders not shown of the main body portions 25A are controlled in accordance with the inclination and roughness of the installation place, which controls the horizontal condition of the housing main body 10.

The second lifting devices 25 maintain the horizontal condition of the housing main body 10 and that of scale 3 also. Then, the scale 3 kept in the horizontal condition performs the weight measurements at the calibration.

Here, the second lifting devices 25 are accommodated in the housing main body 10, and are taken out of the housing main body 10 to fix the calibration device 300. Or, the second lifting devices 25 are preserved in a preservation place not shown other than the measurement housing 1, and can be taken out of the preservation place to be used when the calibration device 300 is fixed.

In addition, instead of disposing the second lifting devices 25 in four corners of the housing main body 10, the second lifting devices 25 can be disposed in three points so as to keep balance of the housing main body 10 when supporting it.

Not shown in the drawing, instead of adjusting and securing the horizontal condition of the housing main body 10 by supporting it through the second lifting devices 25, the second lifting devices 25 can directly support the scale 3 through the pedestal 3B thereof for instance to adjust and secure the horizontal condition of the scale 3.

In addition, when the third embodiment is carried out, only the second lifting devices 25 can be mounted to omit the first lifting devices 24.

A calibration procedure using the calibration device 300 shown in FIG. 4 is basically the same as that of the calibration device 100 according to the first embodiment explained while referring to FIG. 2.

But, before the weigh measurements at the calibration is performed a work for adjusting and securing a horizontal condition of the scale 3 or the housing main body 10 by lengthening/shortening of the extendable rods 25B of the second lifting devices. Then, the extendable rods 24B of the first lifting devices 24 are shortened to mount the measurement housing 1 on the scale 3.

In the third embodiment shown in FIG. 4, since the horizontal condition of the housing main body 10 is adjusted and secured by lifting the second lifting devices 25, it is unnecessary that the workers perform a heavy work for lifting the housing main body 10. Therefore, it is possible to easily and safely maintain the horizontal balance of the scale 3 mounted in the housing main body 10 in a short period of time.

Particularly when a place where the calibration device 300 is installed is inclined or is not flat, the effect by lifting the second lifting devices 25 to adjust and secure the horizontal condition of the scale 3 is enhanced. In the third embodiment, constructions and effects other than those described above are the same as those of the second embodiment shown in FIG. 3.

Next, the fourth embodiment of the present invention will be explained while referring to FIG. 5.

In the drawing, a calibration device according to the fourth embodiment of the present invention is totally shown by a numeral character 400. The calibration device 400 includes: lifting devices 34, instead of the first lifting devices 24, and pedestals 36 separately disposed to four corners of the scale pedestal portion 3B; and a level sensor 37 for judging a horizontal condition of the scale 3, and height of the scale main body portion 3A can be adjusted. Then, the calibration device 400 is constructed to mount the measurement housing 1 on the scale 3 and to separate the measurement housing 1 from the scale 3. Constructions in the fourth embodiment other than those described above are the same as those of the calibration device 200 of the second embodiment.

In FIG. 5, the lifting devices 34 are separately disposed to four corners, for instance, of a scale main body portion 3A and on the bottom portion of the housing main body 10 so as to support the scale main body portion 3A.

The lifting device 34 is a conventionally known stand-type lifting device with hydraulic pressure, pneumatic pressure or other hydrostatic pressure such as a jack, and is provided with: a main body portion 34A including a hydraulic cylinder not shown; an extendable rod 34B of the hydraulic cylinder; and a supporting portion 34C. The lifting devices 34 are disposed to the four corners of the scale main body portion 3A; the supporting potions 34C of the lifting devices 34 support the four corners of the scale main body portion 3A; and the hydraulic pressure lengthens/shortens the extendable rods 34B to lift the scale main body portion 3A.

Except at a process for measuring weights, as shown in FIG. 5(a), the extendable rods 34B of the lifting devices 34 are shortened, and the scale main body portion 3A is separated from the scale pedestal portion 3B on which the measurement housing 1 in a vertical direction. That is, except for the weight measurements, a condition that the measurement housing 1 is separated from the scale 3, which is a condition that the weight of the measurement housing 1 is not measured, is maintained.

In addition, maintaining the condition that the measurement housing 1 is separated from the scale 3 except for weight measurements prevents, even when vibrations and shocks are transmitted to the measurement housing 1 by the movement of the calibration device 100, the vibrations and the shocks from transmitting to the scale 3. Therefore, it is prevented that the scale 3 breaks down, and a zero point and a span, which is variation change, of the scale 3 change.

Meanwhile, at the weight measurements, the extendable rods 34B of the lifting devices 34 are lengthened to move the scale main body portion 3A up. With this, the upper face of the scale main body portion 3A contacts the lower face of the scale pedestal portion 3B on which the measurement housing 1 is mounted, and the scale pedestal portion 3B is separated from the pedestal 36 in a vertical direction, which allows the scale pedestal portion 3B to be mounted on the scale main body portion 3A. That is, at the weight measurements is mounted the measurement housing 1 on the scale 3.

When by the lifting devices 34 disposed in the four corners of the scale main body portion 3A is lifted the measurement housing 1, in order to keep a horizontal condition of the scale 3, positions in a vertical direction and lifting velocities of the supporting portions 34C of the lifting device 34 are adjusted. Here, the level sensor 37 can judge whether a horizontal condition of the scale 3 is kept or not.

A calibration procedure using the calibration device 400 shown in FIG. 5 is basically the same as that of the calibration device 100 according to the first embodiment explained while referring to FIG. 2. But, in the embodiment shown in FIG. 5, before the weight measurements at the calibration, work for mounting the measurement housing 1 on the scale 3 by lengthening the extendable rods 34B of the lifting devices 34 is performed.

With the fourth embodiment shown in FIG. 5, when the weight measurements are performed at the calibration, the measurement housing 1 can be automatically and safely mounted on the scale 3 without man power. Other than at the weight measurements, detaching the measurement housing 1 from the scale 3 prevents vibrations and shocks transmitted to the measurement housing 1 from transmitting to the scale 3, which prevents the scale 3 from being broken or the zero point or the span, that is variation change, from changing.

Effects in the fourth embodiment other than described above are the same as those of the second embodiment shown in FIG. 3.

As the same as the third embodiment can be mounted the second lifting devices 25 for adjusting and securing the horizontal condition of the scale 3 by supporting the housing main body 10 in addition to the lifting device 34.

The embodiment shown in the drawings are just examples, and a technical field of the present invention is not limited to the embodiments. For example, in the embodiments shown in the drawings, calibration devices for a hydrogen filling apparatus are explained, but the present invention is applicable to a calibration device for a CNG filling apparatus.

DESCRIPTION OF THE REFERENCE NUMERALS 1 measurement housing
2 filling vessel
3 scale
3A scale main body portion
3B scale pedestal portion
4 supporting member
5 gas outlet
6 receptacle (hydrogen receiving port)
7 filling gas feeding pipe
8 filling gas discharging pipe
9 check valve
10 housing main body
10A moving means (wheels etc.)
11 temperature meter
12, 23 pressure gauges
13 temperature transmitter
14 pressure transmitter
15 flow meter
16 depressurizing valve
17 shut-off valve
18 dry gas pipe
19 dew-point instrument
20 hydrogen filling apparatus
21 filling nozzle
22 outside-discharging pipe
24 first lifting device
25 second lifting device
26 master valve
34 lifting device
36 pedestal
37 level sensor
100, 200, 300, 400 calibration devices

What is claimed is:

1. A calibration device comprising:
a housing main body;
a measurement housing, accommodated in the housing main body, to said measurement housing a high pressure fuel gas being fed from outside of the housing main body;
a scale for measuring a weight of a fuel gas fed to the measurement housing;
a filling vessel arranged inside the measurement housing, said high pressure fuel gas being fed to said filling vessel; and
a first lifting device for separating the measurement housing from the scale in a vertical direction or mounting the measurement housing on the scale,
wherein said measurement housing is made of a transparent resin with antistatic function and an inside of the measurement housing is visible from outside of the housing main body.

2. The calibration device as claimed in claim 1, further comprising status monitoring equipment disposed in the measurement housing, wherein data measured by the status monitoring equipment are transmitted outside the housing main body.

3. The calibration device as claimed in claim 1, further comprising:
a filling gas discharging pipe connected to the measurement housing; and
a depressurizing valve mounted to the filling gas discharging pipe.

4. The calibration device as claimed in claim 1, further comprising a second lifting device for lifting the housing main body to adjust and secure a horizontal condition of the scale.

5. The calibration device as claimed in claim 1, wherein the scale has a level sensor for judging a horizontal condition of the scale.

6. The calibration device as claimed in claim 2, wherein the scale has a level sensor for judging a horizontal condition of the scale.

7. The calibration device as claimed in claim 3, wherein the scale has a level sensor for judging a horizontal condition of the scale.

8. The calibration device as claimed in claim 4, wherein the scale has a level sensor for judging a horizontal condition of the scale.

* * * * *